ELECTRICAL CONDUCTORS WITH CHROMATE SOLDER BARRIER AND METHOD OF FORMING

Filed May 25, 1972

United States Patent Office 3,827,918

Patented Aug. 6, 1974

3,827,918

ELECTRICAL CONDUCTORS WITH CHROMATE SOLDER BARRIER AND METHOD OF FORMING

Thomas J. Ameen, Endicott, and Nimrod N. Mesley, Endwell, N.Y., assignors to International Business Machines Corporation, Armonk, N.Y.

Filed May 25, 1972, Ser. No. 256,735
Int. Cl. B44d *1/18*; C23f *7/26*
U.S. Cl. 117—6.2 17 Claims

ABSTRACT OF THE DISCLOSURE

Printed circuit conductors are selectively coated with a chromate conversion film to confine molten solder to selected areas during reflow and thereby prevent wicking. Methods of application allow immersion coating of the chromate, either with or without solidified solder present in the selected areas. With solder present, a passivation layer is formed on the solder to prevent chromate deposition, and without the presence of solder a removable protective resist is applied to prevent chromating on the selected areas. The chromate conversion coating withstands successive flux applications and reheating for repetitive assembly and disassembly of the solder joints without allowing solder runback.

BACKGROUND OF THE INVENTION

Figure 1:
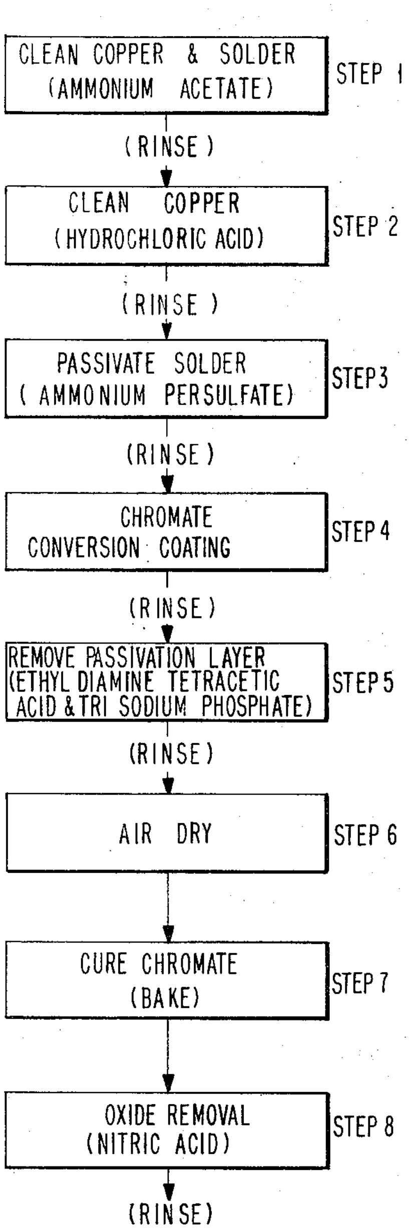

This invention is concerned generally with the attachment of circuit devices and elements to each other or to printed circuits by solder reflow techniques, and more particularly with the construction of solder barriers to prevent runback or wicking along a conductor by molten solder. Circuit modules and chips are often connected to each other or to circuit lands by forming solder globules or mounds on selected areas. The solidified mounds are then brought into contact with the land areas of solder wettable material, reheated, usually in the presence of applied flux, to a molten state so that attachment is accomplished. During the reflow, however, there is a tendency for the solder to wick along the conductor away from the joining area when the conductor is a material having an affinity for solder, such as clean copper. The wicking is deleterious, since it depletes the land area of solder for necessary joint strength and also allows collapse of the solder column between joined surfaces which prevents the desired standoff and flexibility necessary for durable joints.

Various solutions have been proposed to prevent wicking by constructing barriers to solder flow of materials that either repel or are not wet with molten solder. Typical of the barriers used are formation of oxides of the metal, plating non-wettable metals onto the conductors, applying commercial solder resistant materials, or screening on miniature dams of non-wettable material. These solutions each have utility in their particular application, but each still has disadvantages which restrict their use, such as requiring added processing steps, difficulty in restricting coverage, inability to withstand repetitive flux applications or reheating, or low reliability in satisfactorily coating the required areas. Oxides of the base metal frequently fail in the presence of flux, even when the flux application is mild and limited. Plating of conductors with solder repellent materials such as chromium or nickel, requires several added processing steps, thus adding cost and reducing overall reliability; in addition, it is usually difficult to plate the sides of the conductors, unless the circuit lines are commonly connected. The commercial resists have disadvantages of being thick films, too readily soluble in fluxes, or incapable of meeting selective application on miniature circuits.

It is, therefore, a primary object of this invention to provide for electrical conductors an improved, novel solder barrier and method of application which will reliably restrict the flow of molten solder.

Another principal object of this invention is to provide an electrical conductor having a selectively applied chromate conversion coating thereon which serves as a barrier repelling molten solder.

A further object of this invention is to provide a method of selectively forming chromate solder barriers on electrical conductors when solidified solder is present.

An important object of this invention is to also provide a method of selectively forming chromate solder barriers on electrical conductors prior to the placement of solder thereon.

It is a still further object of this invention to provide a solder barrier for copper conductors which is a conformal, durable coating that can be inexpensively applied and can withstand repetitive fluxing and reheating.

SUMMARY OF THE INVENTION

The inventors have discovered that chromate conversion coatings can be applied to exposed circuit metals to produce a film that is not wet by molten solder so that it effectively and reliably prevents wicking, and provides a durable barrier film which will withstand repetitive applications of the usual flux and heat.

Chromate conversion coatings are commercially available and have long been known and used as coatings for metal to inhibit corrosion and provide an excellent bonding surface for paints. It is also known that thick coatings are difficult to solder to and have to be removed either chemically or mechanically to produce a reliable solder joint. Chromate conversion coatings, however, have not been recognized as satisfactory barriers to solder wicking in the art of printed circuits.

Bus using a chromate conversion coating in conjunction with selectively applied resists, a solder repellent coating can be reliably applied to leave clean solderable lands at desired locations while forming an effective barrier on the remaining portions of the circuits. The chromate coatings provide a sufficiently durable surface to permit several cycles of reheating of flux application. Such characteristics particularly facilitate the attachment and change of components and circuit chips.

These coatings are compatible and applicable with conventional photoresist techniques commonly used in printed circuit forming processes, thus allowing use of available manufacturing equipment. They can alternatively be applied after solder has been placed on land areas by plating. Also disclosed herein is a highly satisfactory passivation means which results in no detriment or aleration of the reflow or joining characteristics of plated solder when subjected to the chromate conversion coating.

The use of chromate conversion coatings on exposed circuit metals has been found to be advantageous in that it forms a thin, tough, adherent film which readily conforms to the circuit conductors and substrate. Yet, if necessary, the coating can be selectively removed by acids and applied resist materials. This is particularly desirable in the event future circuit changes become necessary.

The foregoing and other objects, features and advantages of the invention will be apparent from the following more particular description of preferred embodiments of the invention as illustrated in the accompanying drawings.

Figure 2:
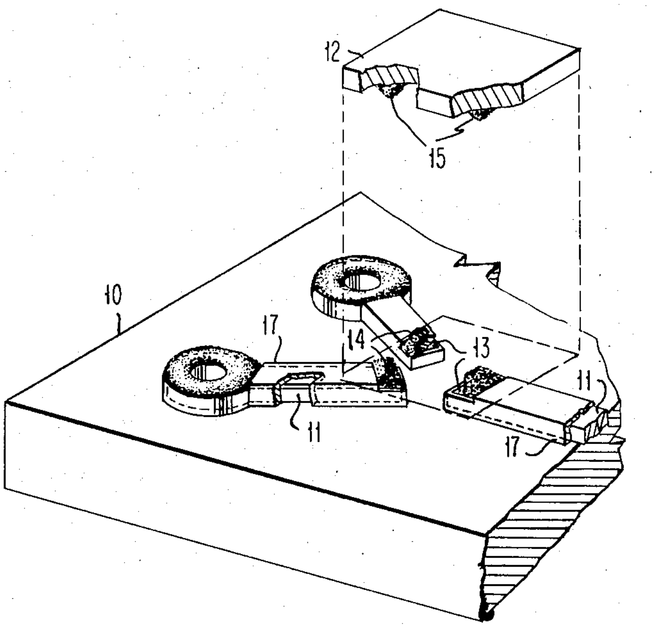
Figure 3:
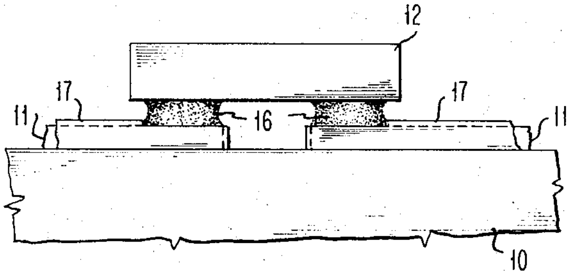

FIG. 1 is a flow diagram of the process steps for selectively producing a chromate converstion coating on circuit lines and substrate when solidified solder mounds are present at future attachment sites;

FIG. 2 is an exploded perspective view of a portion of a substrate with circuits thereon on which a chromate conversion coating has been applied and of a circuit chip to be attached, and FIG. 3 is an elevation view of the circuit substrate, lines and chip joined thereto illustrating the solder pedestals supporting a circuit chip and showing the effect of the chromate solder barrier on the circuit lines.

DESCRIPTION OF THE PREFERRED EMBODIMENTS

Referring to FIG. 1, there are identified the steps and their sequence for the process of applying a chromate conversion coating to a substrate of electrically insulative material having thereon electrically conductive circuit lines and solder mounds, such as shown in FIGS. 2 and 3. However, before describing each process step in more detail, the assembly of an electrical component to the substrate circuits will be briefly discussed.

Referring to FIGS. 2 and 3 an electrically insulative substrate 10 is formed with electrically conductive lines 11 thereon to which a circuit device 12, such as an integrated circuit chip, is to be attached. The substrate is usually of either ceramic or organic composition or possibly a combination, and lines 11 are conventionally copper. The lines may be formed by additive or substractive processes. At selected land areas 13, quantities of solder in the form of mounds 14 are deposited for subsequently attaching the circuit device which usually has corresponding solder mounds 15, although not required. The solder can be applied to the various land areas by vacuum deposition, plating or by solder wave.

To accomplish assembly of the circuit device to the solder-coated lands 13, generally a limited coating of a mild flux is applied over the solder and the device 12 is placed thereon. The substrate, if it can withstand the temperature, and chip can be passed through a furnace which will raise the temperature of the solder mounds to the molten state. If the substrate cannot withstand the heat, the device 12 can be held in place while hot gasses are applied to localized areas to melt the solder.

A result of the solder reflow is illustrated by solder columns 16 supporting the circuit device 12, above the level of lines 11. It is desirable in the attachment of the devices that they be supported on well-formed pedestals 16 to effect good electrical and mechanical connections with the circuit lines. It has been found that a well-formed column 16 can withstand the thermal cycling encountered in actual use because the column can accommodate differences in thermal expansion between the chip and substrate. When the solder columns are not formed such as when the molten solder wicks along the lines 11, the joint becomes too inflexible to withstand the relative movement and thus will fracture due to fatigue. Therefore, it is highly desirable to confine the molten solder to the particular land area, and this is done by constructing barrier coatings 17 adjacent the land area. Often times the circuit device 12 will need to be replaced and this is done by simply reheating the columns 16 to a molten state and pulling device 12 away. A new device is attached in the same manner as that used when the original device 12 was assembled to the circuit lines.

Referring to the steps of the process depicted in FIG. 1, this sequence is that used when the substrate has copper circuit lines thereon and solder mounds have been selectively plated in place at the desired land areas of the lines, such as with plating resists. In the following process all baths are at room temperature and all rinses are in deionized water.

In accordance with step 1 of the process, the substrate with circuit lines 11 and solder mounds 14, is first dipped in a bath of ammonium acetate to remove any coating of lead salts such as sulfates which may have accumulated on the tops of the solder mounds and surrounding area on the circuit line from previous processing steps. Treatment may not be necessary if the sulfate has not formed. The bath is preferably mixed in a concentration of 200 grams of ammonium acetate per liter of deionized water and is used at room temperature. The concentration may vary between 20 and 800 grams per liter, however. This cleaning step is not necessary to the adherence of the chromate conversion coating but any lead sulfate on the copper adjoining the solder mound would prevent coating that copper with the chromate. Following the dip, the substrate is rinsed in deionized water.

Step 2 of the process is to insure that any copper oxide on the circuit lines is removed, and this is accomplished by approximately a one minute dip in a bath of hydrochloric acid at $5.3\pm.2$ Bé. also at room temperature. Upon removal from the bath, again the substrate and circuits are rinsed.

Step 3 of the process is that of passivating the tin-lead solder mounds to deter the deposition of any chromate coating thereon. This is accomplished by immersing the substrate with its circuits and solder mounds in an ammonium persulfate bath for approximately one minute. The bath is constituted of water $225\pm25$ grams per liter of ammonium persulfate and a 2–4%, preferably 4% solution by volume of sulfuric acid. Immersion is continued for a one minute duration. Thereafter, the substrate is rinsed.

Step 4 is the application of the chromate conversion coating to the circuit lines. A satisfactory bath is that mixed in accordance with the manufacturer's recommendations for Kenvert No. 31 supplied by the Conversion Chemical Corporation of Rockville, Conn. This coating produces a heavy chromate film on copper and copper alloys and is mixed in the ratios of 160 cc. of the Kenvert No. 31 solution and 840 cc. of water. In addition, 6.5 grams of sodium chloride are added to the solution. This ratio produces a solution having a pH of approximately 1.2, and this is modified by the addition of sodium hydroxide to produce a pH preferably in the range of 2.2 to 2.3, although a pH of 2.1 to 4.0 is operable. The passivation layer on the mounts tends to break down occasionally in the chromate bath at the pH of 1.2. Adjustment of the pH to 2.2 to 2.3 has been found to decrease and almost eliminate degradation of the passivation layer. This inhibits chromate formation on the solder mounds while giving a highly satisfactory coating on the circuit surfaces. The higher pH value increases the immersion time since it slows the deposition of the coating of the surface of the circuit lines. Immersion time can be varied from less than a minute to ten minutes. However, an optimum time has been four to six minutes to get a maximum coating. If immersion is continued beyond the ten minute range, it will have a tendency to slough off and start to reform. However, an effective barrier is formed after approximately the one minute interval. At the completion of the immersion time, the substrate is removed and rinsed for approximately thirty seconds.

Following the chromate coating step, removal of the passivation layer from the solder mounds is accomplished in step 5. This is done by immersing the substrate in a bath of ethylene diamine tetracetic acid (EDTA) and trisodium phosphate (TSP) which are mixed in proportions of approximately $125\pm10$ grams of EDTA and $25\pm5$ grams of TSP per liter of water. Dissolution of the EDTA is accomplished by making additions of a sodium hydroxide solution until the desired pH is reached, which is preferably approximately 9.0. Immersion time is approximately one minute. As mentioned, this removes the passivation layer over the solder and any residual chrome ions. The substrate after immersion is rinsed for approximately 60 seconds.

Step 6 is that of air drying the now coated circuits on the substrate. Although not necessary, the following step 7 is that of oven baking the substrate at approximately 220° F. for 20 minutes. This will increase the resistance of the chromate conversion coating to the application of acid and make it a more durable coating in the presence of the applied fluxes during solder reflow. The baking temperature is low enough to avoid damage to common organic substrates.

The last step in the sequence, step 8 is to immerse the substrate and circuit, after cooling to room temperature from the baking cycle, in a nitric acid bath at 5.2±.2 Bé. for approximately one minute. This bath is necessary to remove any oxide layer from the solder mounds resulting from the baking operation. Thereafter, the substrates are again rinsed and dried.

At this point the circuitized substrates are ready for the application of flux to the solder mounds and attachment of circuit components or chips by reflowing the solder in either an oven or by the application of localized heat such as with a hot gas gun or resistance element. Upon reheating, the molten solder at the land areas 13 seen in FIGS. 2 and 3 will remain only in those areas and not tend to wick along the circuit line.

As an alternative process for the application of a chromate solder barrier, the tin-lead solder mounds can be omitted until the chromate coating has been applied. In this process, conventional photopolymers such as AZ–345 photoresist, available from Shipley Co., Inc., at Newton, Mass., are used to protect future land areas from the chromate coating when solder is to be subsequently applied at those areas. In this process, a coating of photoresist is applied over the entire surface of the substrate and circuit lines and selectively exposed to result in cross-linked resist at the land areas to thus form a protective coating. After development of the resist, the substrate is subjected to step 2, described above, to clean the copper circuit lines and after rinsing is subjected directly to step 4, bypassing step 3, and applying the chromate conversion coating. After the coating application, the substrate is subjected to the same succeeding steps as in the preceding embodiment. Thereafter, the photoresist covering the land areas is removed by suitable solvents such as methylene chloride. When this latter process is used, the land areas can be coated with solder by the application of flux and a solder wave machine or the solder mounds may be emplaced by electrolytic plating.

In the event that new land areas under an applied chromate coating are to be required for soldering, the chromate conversion coating may be removed by scraping or coating with a photoresist which is selectively exposed and developed to permit access to the new areas. The exposed chromate is then chemically removed. An example of one bath is nitric acid at 25±.2 Bé. Thereafter, circuits are rinsed with immersion time of 60±5 seconds. The photoresist can then be removed in the usual manner and solder mounds produced on the newly exposed land areas.

It has been found that solders having low tin content are preferable, such as 0–15% tin. Difficulty may occur in forming the required passivation layer on solders having higher tin content.

While a commercial chromate coating, Kenvert No. 31, has been described for use in establishing solder barriers, it has been found that other such solutions are equally effective. Examples of these solutions are given below:

144.9 grams per liter potassium dichromate, 7.4 grams per liter nitric acid, 19.1 grams per liter acetic acid, 6.1 grams per liter sodium chloride.

20.1 grams per liter chromic trioxide, 2.1 grams per liter sodium nitrate, 6.0 grams per liter sodium chloride.

20.1 grams per liter chromic trioxide, 29.9 grams per liter sodium dichromate, 2.1 grams per liter sodium nitrate, 18.9 grams per liter acetic acid, 6.0 grams per liter sodium chloride.

An example of another commerical chromate conversion coating solution is Iridite 17P from Allied Chemicals, Inc., Morristown, N.J.

While the invention has been particularly shown and described with reference to preferred embodiments thereof, it will be understood by those skilled in the art that the foregoing and other changes in form and details may be made therein without departing from the spirit and scope of the invention.

We claim:

1. An article of manufacture comprising:

an electrically insulative substrate;

an electrically conductive copper element on said substrate; and a solder barrier on a portion of said element being a chromate conversion coating formed by the action of an acidic hexavalent chromium containing solution.

2. An article of manufacture comprising;

an electrically insulative substrate;

an electrically conductive copper element on said substrate;

solder material on a portion of said element; and a chromate conversion coating on the remaining portion of said element operable to prevent flow thereover when said solder is molten, said coating being formed from an acidic hexavalent chromium containing solution.

3. Structure as defined in Claim 2 wherein said fusible metallic material is lead including from 0–15% tin.

4. The process of forming a barrier on an electrical conductor to prevent the flow of a molten metal beyond a preselected area of said conductor comprising the steps of:

depositing solder on a portion of said conductor, said solder having a melting point lower than said conductor;

covering the exposed surface of said deposited solder with a film that is repellent to a chromate conversion coating;

immersing said conductor and deposited solder in a chromate conversion bath of an acidic hexavalent chromium containing solution to form a coating over said conductor that has no said deposited solder; and removing said repellent film from said deposited solder.

5. A process for forming a barrier on an electrical conductor operable to confine molten solder to a preselected area of said conductor comprising the steps of:

placing a protecting material of photosensitive polymer over said preselected area of said conductor;

immersing said conductor with said protective material in a bath of an acidic hexavalent chromium containing solution for forming a chromate conversion coating on said exposed conductor; and removing said protective material from over said area.

6. The process as described in Claim 5 further comprising the step of curing said chromate conversion coating by baking.

7. The process of forming a circuit element having conductors thereon with solderable connecting areas and barriers to confine molten solder to said areas comprising the steps of:

forming electrical conductors on an electrically insulative substrate;

selectively depositing solder on said connecting areas;

forming with ammonium persulfate a passivating layer on said solder;

forming a chromate coating on the areas of said conductors not covered by said passivating layer by the action of an acidic hexavalent chromium containing solution; and removing said passivating layer on said solder.

8. The process of forming a barrier coating on an electrical conductor to confine molten solder to a preselected area of said conductor comprising the steps of:

forming an electrical conductor on an insulative substrate;

applying solder to a preselected area of said conductor;

forming a protective coating on said solder with ammonium persulfate to avoid deposition of a barrier coating thereon;

forming a chromate conversion coating with an acidic hexavalent chromium containing solution as a barrier coating on said conductor area not having solder thereon; and removing said protective coating from said solder.

9. The process as described in Claim 8 further comprising the step of curing said chromate conversion coating by baking.

10. The process of claim 8 wherein said protective layer is removed by immersion in a bath including ethyl diamine tetracetic acid and trisodium phosphate.

11. The process as described in Claim 8 wherein said conductor is formed of copper.

12. A process for producing a barrier of a chromate conversion coating on an electrical conductor to confine molten, fusible solder to a preselected connecting area of said conductor comprising the steps of:

forming an electrical conductor on the surface of an an electrically insulative substrate;

placing a repellent material over said connecting area to prevent the deposition of said chromate conversion coating thereon;

forming said chromate conversion coating on the unprotected portion of said conductor by the action of an acidic hexavalent chromium containing solution; and removing said repellent material over said connecting area.

13. The process as described in Claim 12 wherein said repellent material is formed by applying a photosensitive polymer on said conductor, selectively exposing and developing away said polymer except on said connecting area.

14. The process as described in Claim 12 wherein solder is deposited on said connecting area as a fusible metal and said repellent material is a passivating layer formed with ammonium persulfate on the surface of said solder.

15. A process for forming a barrier coating on an electrical conductor to confine molten solder thereon to a preselected area of said conductor comprising the steps of:

forming an electrical conductor on an insulative substrate;

applying a protective coating of a photosensitive polymer to said preselected area to avoid deposition of a barrier coating thereon;

forming a chromate conversion coating by action of an acidic hexavalent chromium containing solution on said conductor;

removing said protective coating from said conductor; and depositing solder on said area.

16. The process as described in Claim 15 wherein said solder is deposited on said area by immersing said conductor in molten solder.

17. The process as described in Claim 15 wherein said conductor is formed of copper.

References Cited

UNITED STATES PATENTS

| | | | |
|---|---|---|---|
| 3,401,126 | 9/1968 | Miller et al. | 117—212 |
| 3,579,376 | 5/1971 | Vincent, Jr. | 117—212 |
| 3,628,999 | 12/1971 | Schneble, Jr., et al. | 117—212 |
| 3,733,182 | 5/1973 | Crossland et al. | 117—217 |

CAMERON K. WEIFFENBACH, Primary Examiner

U.S. Cl. X.R.

117—212, 217; 148—315